US005608332A

United States Patent [19]
Crayton et al.

[11] Patent Number: 5,608,332
[45] Date of Patent: Mar. 4, 1997

[54] DYNAMIC GAIN ADJUSTMENT IN ELECTROMAGNETIC WAVE HYDRAULIC CYLINDER PISTON POSITION SENSING

[75] Inventors: John W. Crayton, Washington; Eric F. Lee, Peoria Heights, both of Ill.; Denny Morgan, San Diego, Calif.; Dennis L. Schumacher, Eureka, Ill.

[73] Assignee: Caterpillar Inc., Peoria, Ill.

[21] Appl. No.: 437,611

[22] Filed: May 9, 1995

[51] Int. Cl.⁶ .......................... G01R 27/32; F01B 25/26
[52] U.S. Cl. .................. 324/633; 324/636; 91/1; 92/5 R
[58] Field of Search .................. 324/633, 635, 324/636; 91/1; 92/5 R

[56] References Cited

U.S. PATENT DOCUMENTS

| | | | |
|---|---|---|---|
| 3,589,177 | 6/1971 | Merlo | 73/116 |
| 3,726,191 | 4/1973 | Johnston et al. | 92/5 R |
| 4,321,946 | 3/1982 | Paulos et al. | 137/554 |
| 4,365,503 | 12/1982 | Ho et al. | 73/3 |
| 4,588,953 | 5/1986 | Krage | 324/58.5 C |
| 4,689,533 | 8/1987 | Yang | 318/281 |
| 4,737,705 | 4/1988 | Bitar et al. | 324/635 |
| 4,749,936 | 6/1988 | Taplin | 324/58.5 B |
| 4,757,745 | 7/1988 | Taplin | 91/361 |
| 4,881,071 | 11/1989 | Monterosso et al. | 340/870 |
| 4,901,628 | 2/1990 | Krage | 92/5 R |
| 4,952,916 | 8/1990 | Taplin | 340/686 |
| 4,987,823 | 1/1991 | Taplin | 91/361 |
| 5,150,060 | 9/1992 | Bitar | 324/635 |
| 5,182,979 | 2/1993 | Morgan | 92/5 R |
| 5,241,278 | 8/1993 | Bitar | 324/635 |
| 5,325,063 | 6/1994 | Morgan | 324/633 |
| 5,471,147 | 11/1995 | Allen et al. | 324/636 |

FOREIGN PATENT DOCUMENTS

| | | |
|---|---|---|
| 0199224 | 4/1985 | European Pat. Off. . |
| 61-021524 | 1/1986 | Japan . |

Primary Examiner—Maura K. Regan
Attorney, Agent, or Firm—Alvin J. Riddles; Steven G. Kibby

[57] ABSTRACT

Dynamic gain adjustment in hydraulic piston position sensing that continuously accommodates for changes in signal level is provided by attenuating the gain of the sensing system through a comparison of a measured value with a stored value at each piston position.

19 Claims, 6 Drawing Sheets

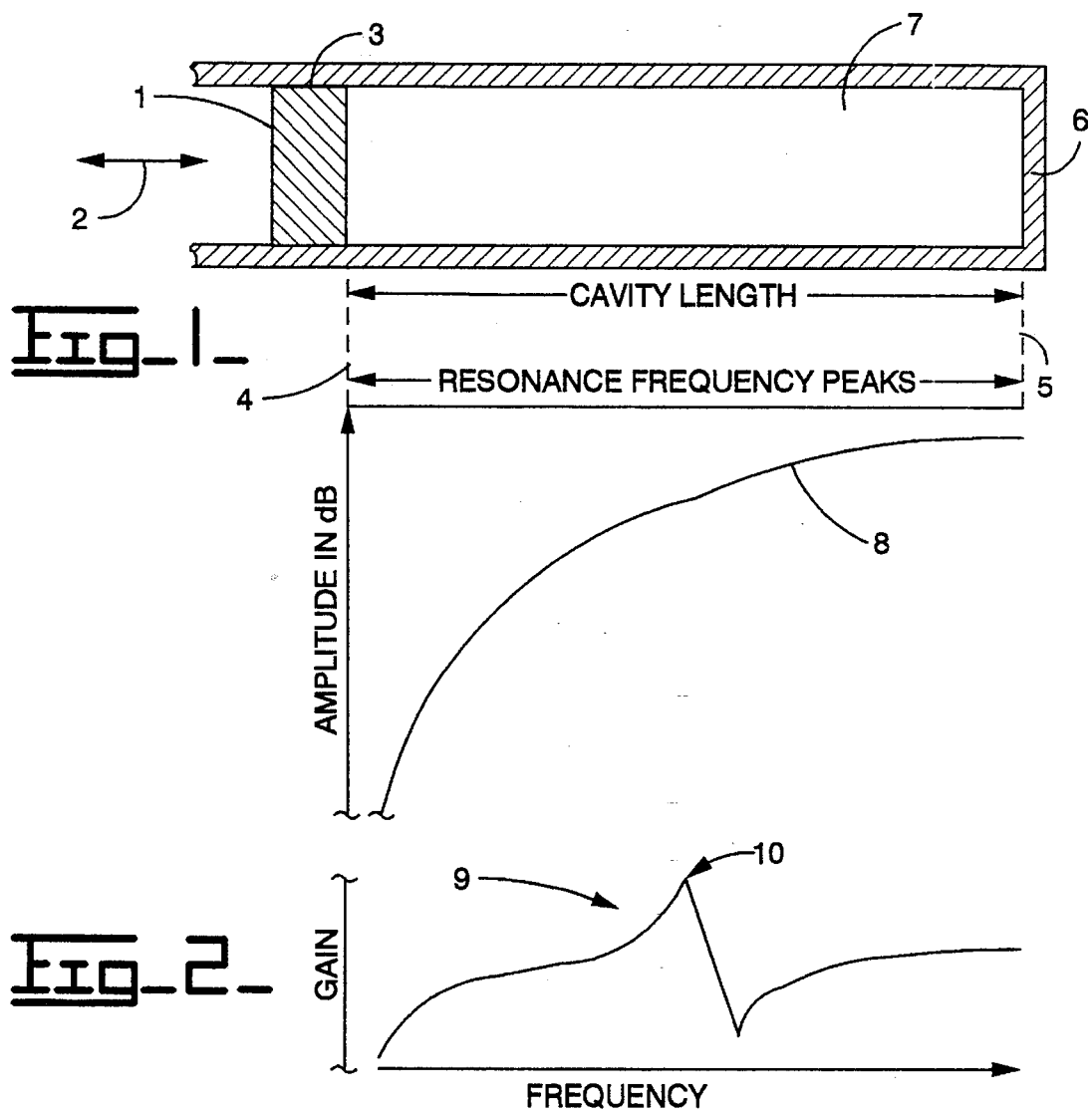
Fig_1_
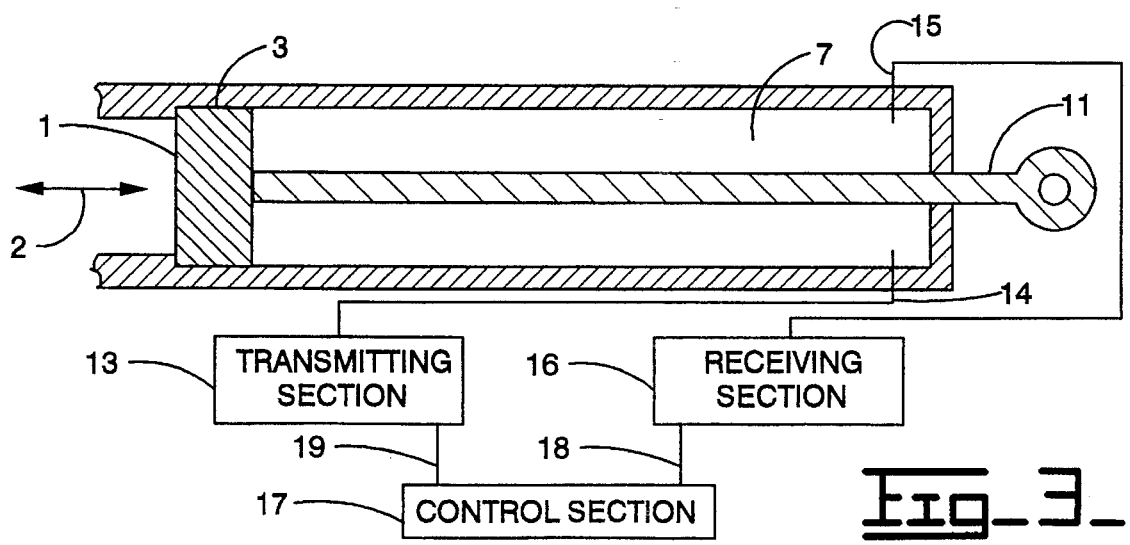
Fig_2_
Fig_3_

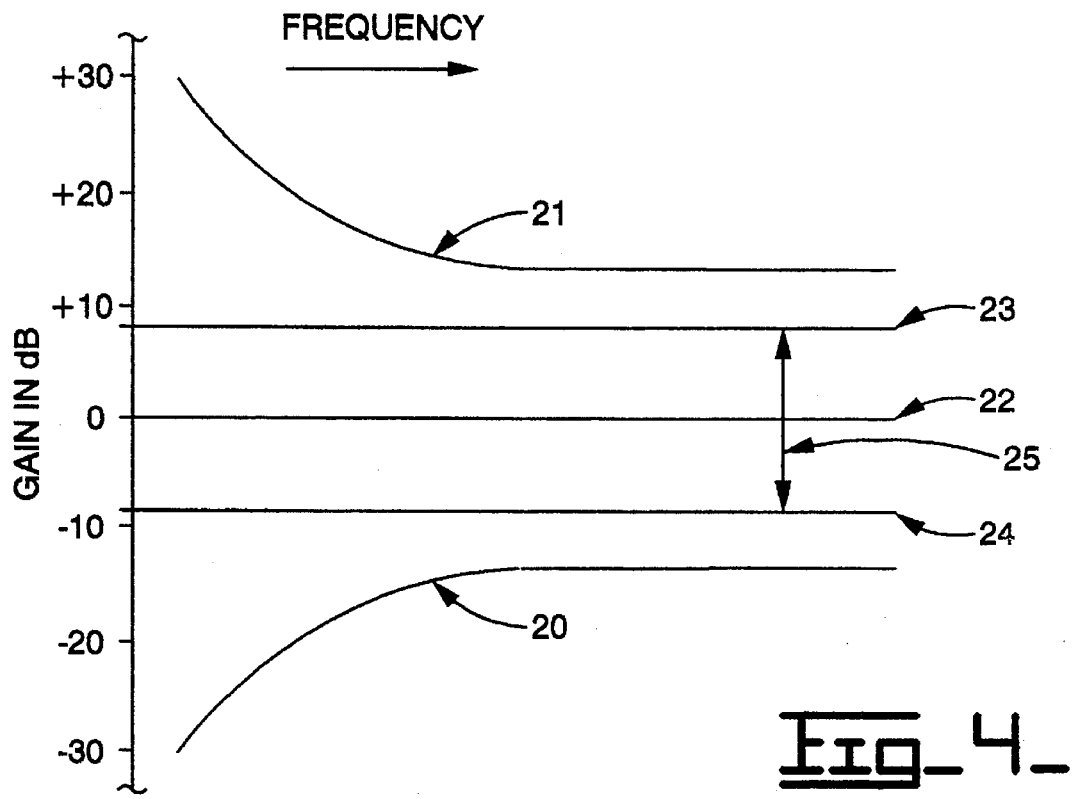
Fig_4_
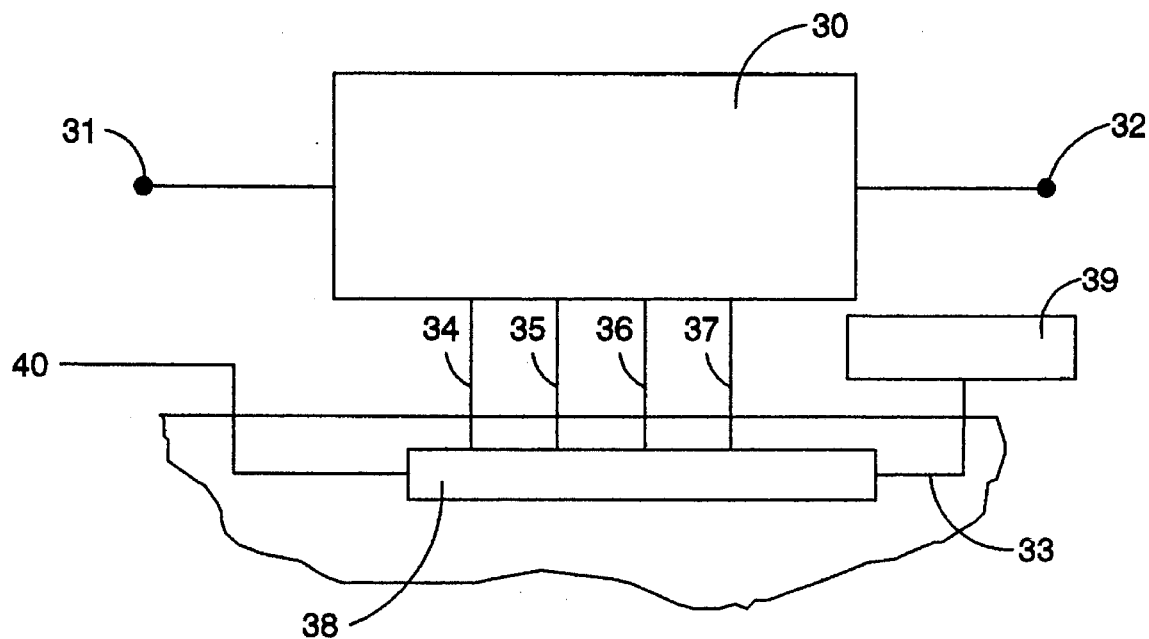
Fig_5_

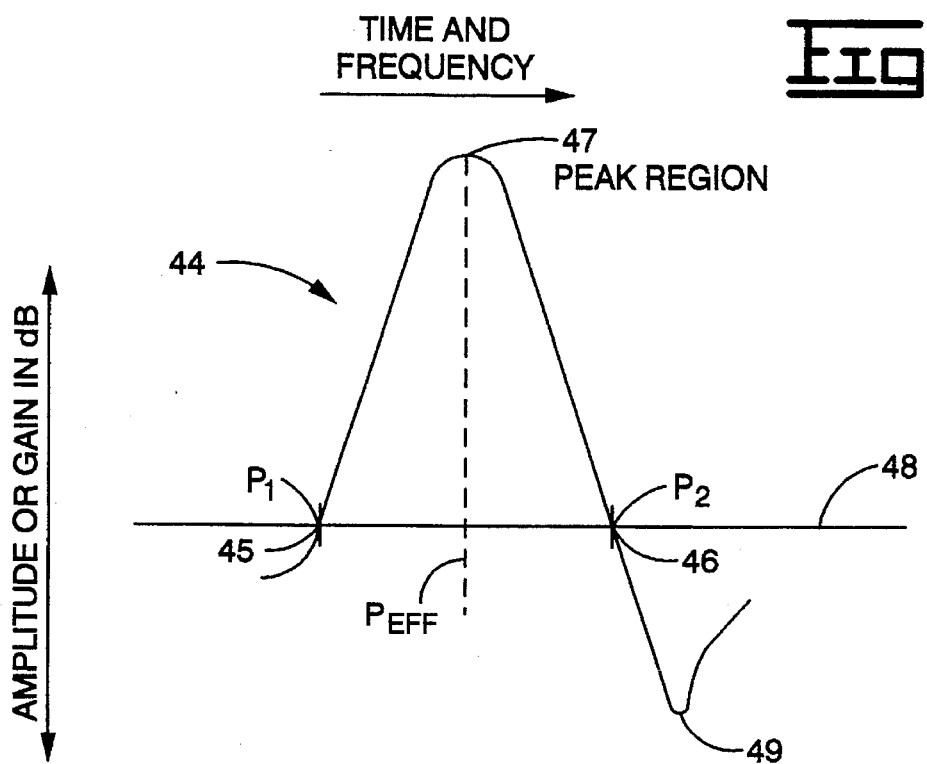
Fig_6_
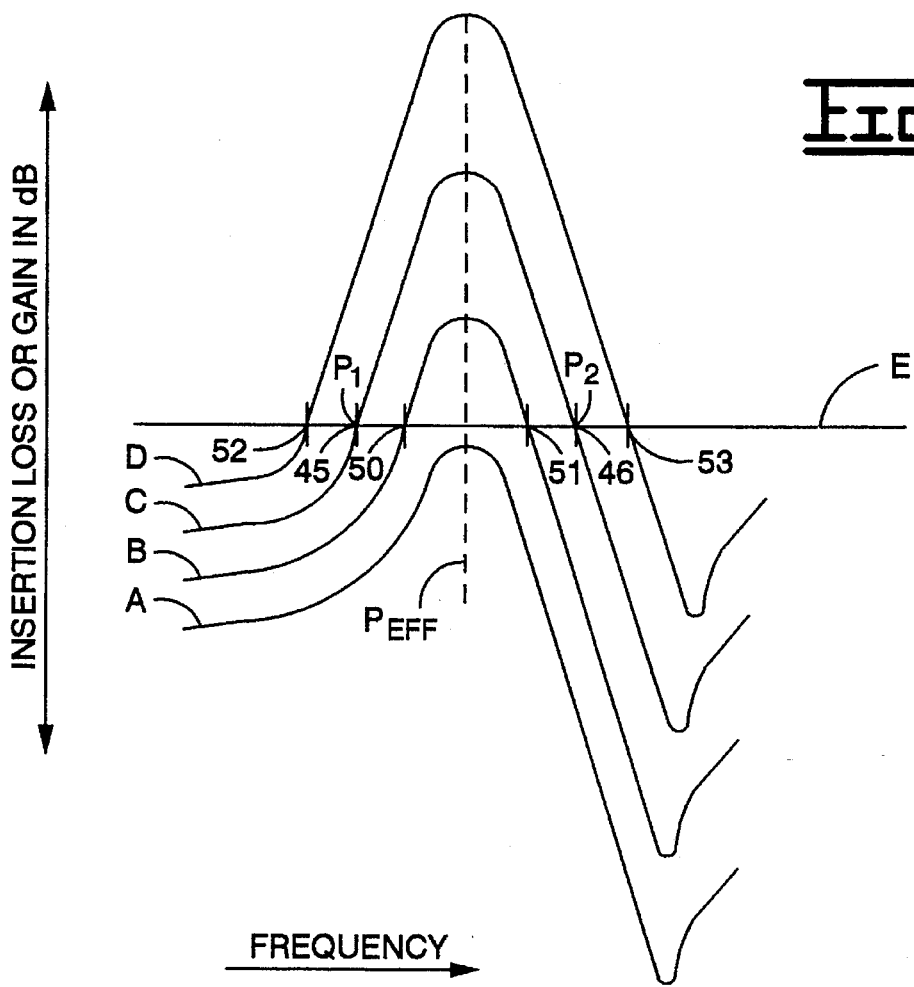
Fig_7_

Fig_9_
| A | B | C | D | E |
|---|---|---|---|---|
| FREQUENCY | PERIOD | DISTANCE | PERIOD * 130944 | COUNTS |
| 100000000/C* | 1/A* | meters | (1/A) * 130944 | (D*) * 16MHz |
| 50000000 | 0.000000020000 | 2.00 | 0.002618880 | 41902.080 |
| 52631579 | 0.000000019000 | 1.90 | 0.002487936 | 39806.976 |
| 55555556 | 0.000000018000 | 1.80 | 0.002356992 | 37711.872 |
| 58823529 | 0.000000017000 | 1.70 | 0.002226048 | 35616.768 |
| 62500000 | 0.000000016000 | 1.60 | 0.002095104 | 33521.664 |
| 66666667 | 0.000000015000 | 1.50 | 0.001964160 | 31426.560 |
| 71428571 | 0.000000014000 | 1.40 | 0.001833216 | 29331.456 |
| 76923077 | 0.000000013000 | 1.30 | 0.001702272 | 27236.352 |
| 33333333 | 0.000000012000 | 1.20 | 0.001571328 | 25141.248 |
| 90909091 | 0.000000011000 | 1.10 | 0.001440384 | 23046.144 |
| 100000000 | 0.000000010000 | 1.00 | 0.001309440 | 20951.040 |
| 111111111 | 0.000000009000 | 0.90 | 0.001178496 | 18855.936 |
| 125000000 | 0.000000008000 | 0.80 | 0.001047552 | 16760.832 |
| 142857143 | 0.000000007000 | 0.70 | 0.000916608 | 14665.728 |
| 166666667 | 0.000000006000 | 0.60 | 0.000785664 | 12570.624 |
| 200000000 | 0.000000005000 | 0.50 | 0.000654720 | 10475.520 |
| 250000000 | 0.000000004000 | 0.40 | 0.000523776 | 8380.416 |
| 333333333 | 0.000000003000 | 0.30 | 0.000392832 | 6285.312 |
| 500000000 | 0.000000002000 | 0.20 | 0.000261888 | 4190.208 |
| 1000000000 | 0.000000001000 | 0.10 | 0.000130944 | 2095.104 |
| 2000000000 | 0.000000000500 | 0.05 | 0.000065472 | 1047.552 |
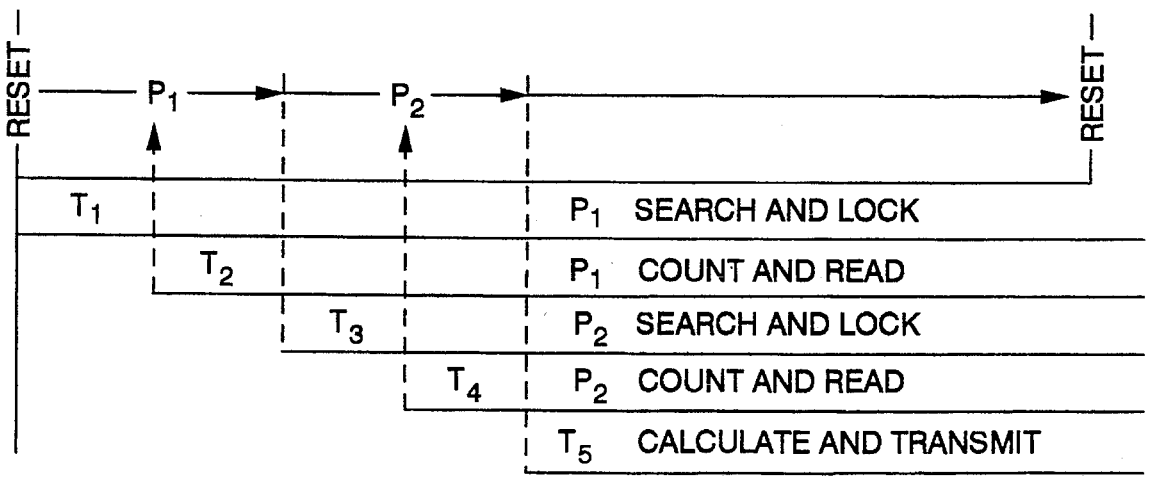
Fig_10_

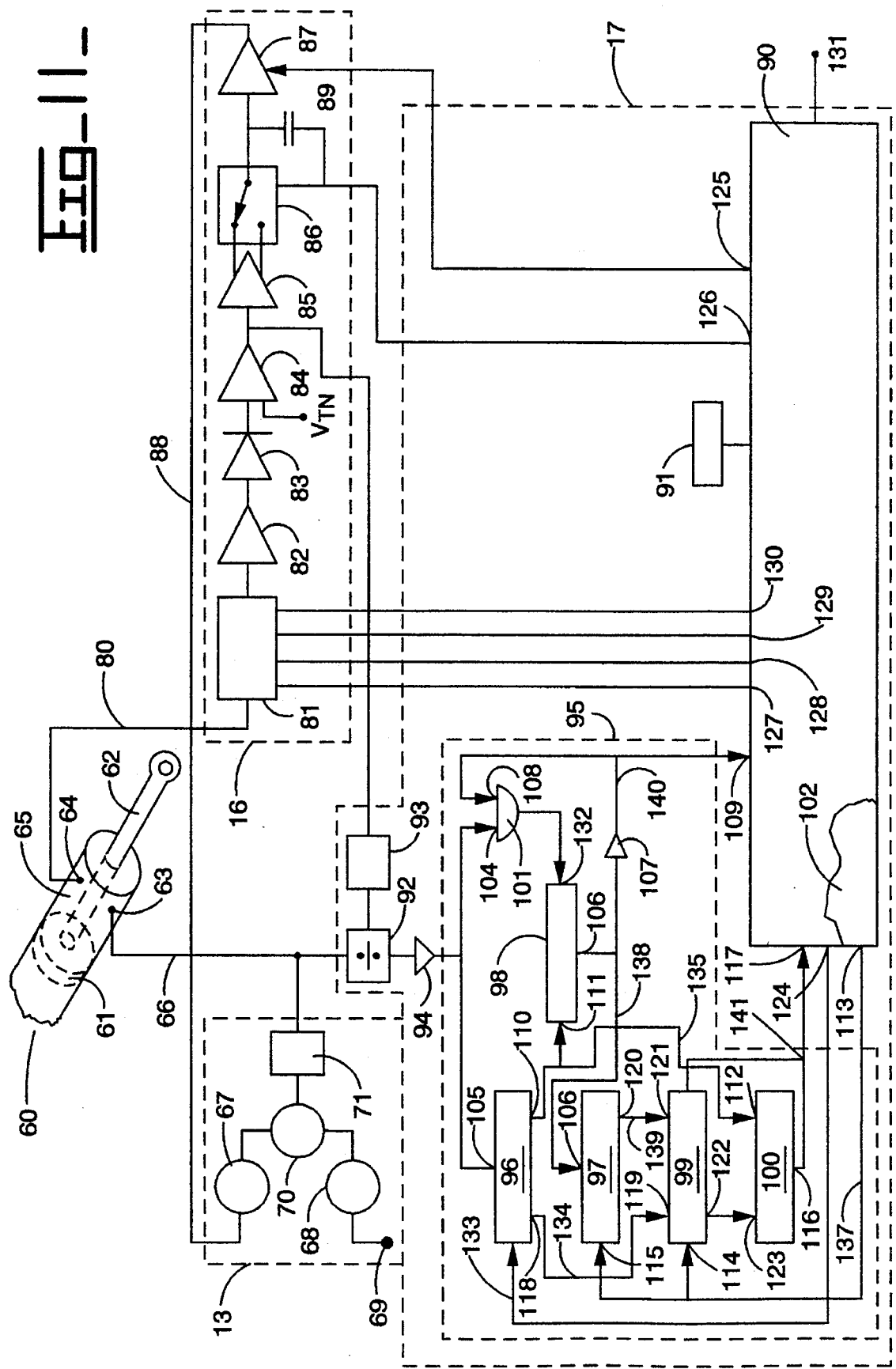

DYNAMIC GAIN ADJUSTMENT IN ELECTROMAGNETIC WAVE HYDRAULIC CYLINDER PISTON POSITION SENSING

TECHNICAL FIELD

The invention relates to the sensing of the position of a piston in a hydraulic cylinder through the use of electromagnetic waves in the cylinder and in particular to increased precision in sensing, achieved through dynamic adjustment of the gain, in the processing of the piston position information.

This invention arose during development efforts related to the subject matter of copending application Ser. No. 08/437,735, filed May 9, 1995, and copending application Ser. No. 08/437,594, filed May. 9, 1995.

BACKGROUND AND RELATION TO THE PRIOR ART

Hydraulic cylinder, piston and rod combinations are being increasingly used in many fields, a principal one of which involves the moving and positioning of material and objects. As the various applications of hydraulic cylinder, piston and rod combinations have progressed, more stringent operational criteria are being encountered, and a need has developed to precisely, reliably and continuously sense the position of the piston and it's related displacement parameters, velocity and acceleration.

A promising approach developing in the art employs the correlation of resonant frequencies of electromagnetic waves in the cavity that is made up of the cylinder and the piston with the dimensions of the cavity. In one aspect of this approach, the wave performance is similar to that of an electrical transmission line with shorted ends, in that the resonance frequency of an electromagnetic standing wave correlates inversely with the cavity length.

In one application of the use of electromagnetic waves for piston position sensing, as shown in U.S. Pat. No. 4,588,953, electromagnetic waves are introduced into the cylinder between the closed end of the cylinder and the piston and wherein different counters are employed to increment the introduced frequency and to correlate the sensed frequency signal, when resonance is detected, with the position of the piston.

In U.S. Pat. No. 4,737,705, a coaxial resonant cavity with a central core is employed within which the electromagnetic waves are launched and propagated in the mode referred to as the transverse electromagnetic wave (TEM) mode. The cylinder on the rod side of the piston is one type of coaxial cavity.

In European Patent Office (EPO) published application number 0 199 224 published Oct. 29, 1986, in a hydraulic cylinder cavity between the closed end and the piston, a variable threshold is employed to distinguish particular frequencies out of a broad range of frequencies.

In U.S. Pat. No. 5,182,979, compensation, through equalization, is provided for differences in insertion losses as the linear extension of the piston and rod in the cylinder takes place.

In U.S. Pat. No. 5,325,063 identification of a fundamental resonance frequency is enhanced by the use of intercepts of the positive and negative slopes of a resonance signal envelope where the positive slope is at the lower frequency and the negative slope is at the higher frequency.

As progress in the art of electromagnetic wave piston position sensing in hydraulic cylinders continues, greater precision is being sought. Accommodation for variations in change of direction, differences between cylinders, temperature responsiveness, static vs dynamic operation and lifetime wear is needed.

SUMMARY OF THE INVENTION

A dynamic adjustment of gain, or signal processing level, is provided, in a hydraulic cylinder electromagnetic wave piston position sensing system, that continuously accommodates for service difference changes in signal level that occur as a result of items such as direction change, differences between cylinders, temperature responsiveness, static vs dynamic operation and wear over lifetime.

The dynamic adjustment is achieved by attenuating or incrementing the gain of the sensing system as needed each cycle through a comparison of a measured width parameter of the resonance signal at the piston position in relation to a previously tabulated width parameter of the resonance signal for that particular cylinder at that particular piston position.

BRIEF DESCRIPTION OF THE DRAWINGS

FIG. 1 is an illustration of the dimensional correlation of the hydraulic cylinder resonance frequency peaks with piston position between the extended and collapsed limits of piston travel.

FIG. 2 is an illustration of a portion of a hydraulic cylinder transfer characteristic curve at a resonance frequency peak.

FIG. 3 is a functional block illustration of a hydraulic cylinder electromagnetic wave position sensor having transmitting, receiving and controlling sections.

FIG. 4 is a graphical illustration of the range of the dynamic gain adjustment of the invention.

FIG. 5 is a diagram of the elements involved in producing a dynamic gain adjustment signal.

FIG. 6 is a graphical illustration of Gain vs Time and Frequency of an electromagnetic wave resonance signal envelope depicting positive and negative intercepts and showing the effective resonance position.

FIG. 7 is an illustration of the considerations involved in the selection and use of lock on points on the positive and negative slopes of a resonance frequency envelope at specific gain levels.

FIG. 9 is an example tabulation of the width parameter type of resonance frequency envelope information, correlated with piston position, that is assembled during static characterization of the cylinder.

FIG. 10 is a cycle event time chart.

FIG. 11 is a functional block diagram of an embodiment of the invention employing dynamic step attenuation gain adjustment.

DESCRIPTION OF THE INVENTION

Figure 8:
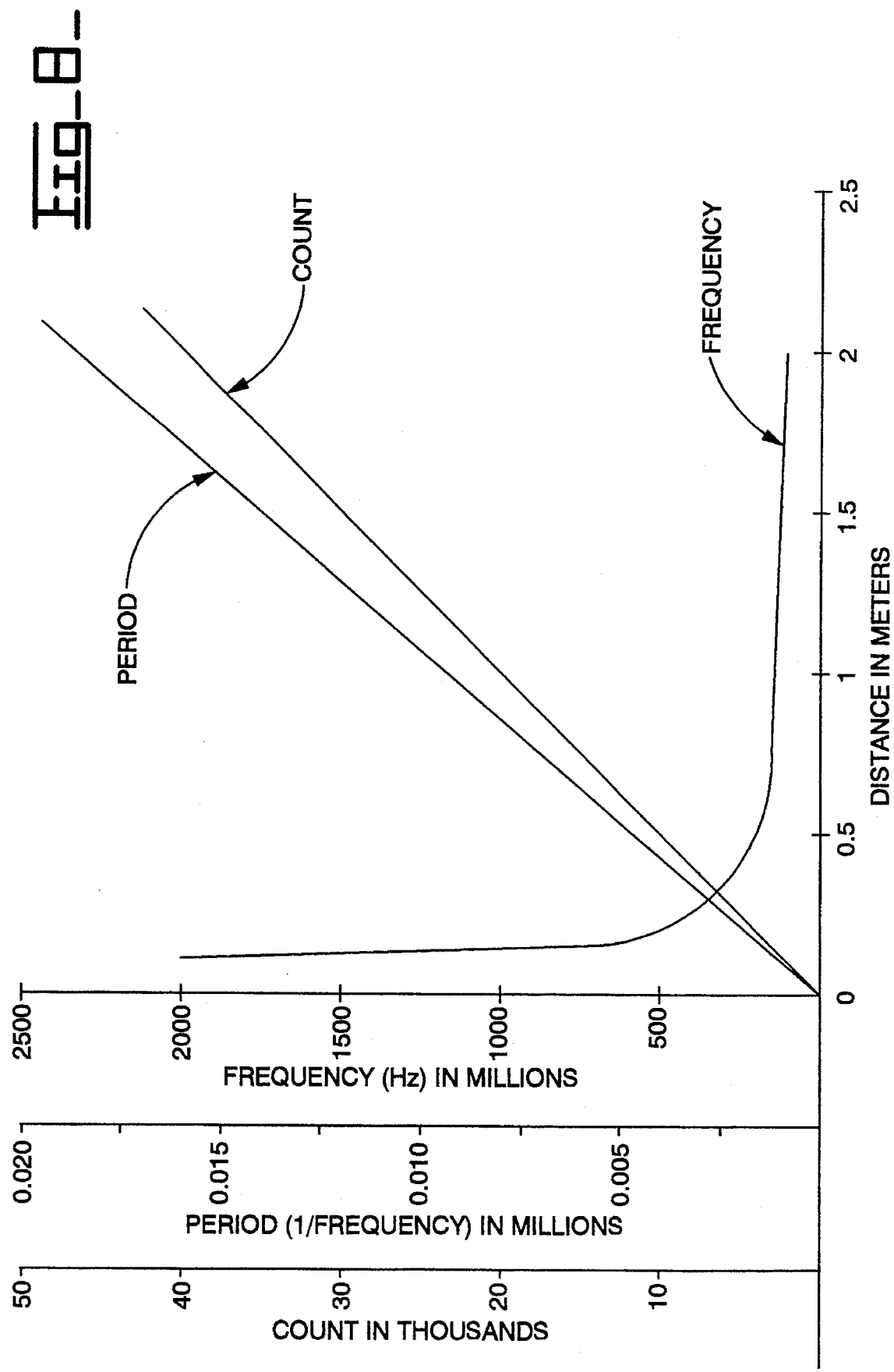
FIG. 8 is a graphical illustration of frequency, period and count variation correlated with piston travel in the hydraulic cylinder.

In one type of piston position sensing system that employs electromagnetic waves in the fluid of a hydraulic cylinder, a varying frequency signal is transmitted into the hydraulic fluid in the cylinder. The varying signal covers the range of critical frequencies at which resonance of the cavity that is made up of the cylinder, the piston and the cylinder end, will take place over the range of piston travel. A frequency signal is sensed in the hydraulic fluid and is delivered to a signal receiver where information is extracted from the sensed frequency signal that permits identification of the position and motion parameters of the piston.

In the hydraulic cylinder cavity there is high loss of the transmitted signal except at a resonance frequency which is at a piston position or cavity length where energy is coupled into a particular mode standing wave thereby producing a significant signal.

There are variations in position sensing systems in the art among: having the cavity on the rod or on the head side of the piston; the excitation of particular mode standing waves; and the sensing of a harmonic other than the fundamental of a particular resonance frequency. For purposes of simplicity and clarity of explanation in the preferred embodiment, a cavity on the rod side of the piston, excitement in the TEM mode and the sensing of the fundamental of the particular resonance frequency for the particular piston position or cavity length, will be discussed.

The resonance frequencies are lower when the cavity is longer and are higher when the cavity is shorter. Correspondingly the amplitude of each resonance frequency will vary with the cavity length, the lower amplitudes being at the lower frequencies and the higher amplitudes being at the higher frequencies.

In accordance with the invention the accuracy of piston position determination is enhanced through dynamic adjustment of the gain or signal processing level in the signal receiving section of the sensing system to correspond to the differences in resonance frequency at the particular piston position.

There are device differences in size from cylinder to cylinder, and service differences in operating characteristics with different direction of movement and between static and dynamic operation, responsiveness to temperature variation, leakage of seals and evolution in operating characteristics over the lifetime of the apparatus, all of which operate to introduce accuracy limitations into a piston position sensing system.

Further, in accordance with the invention the various device and service differences in a system can be accommodated by dynamic gain adjustment that compensates for the effects of any of those differences as they arise in service.

Referring to FIG. 1, there is shown an illustration of the dimensional correlation of the hydraulic cylinder resonance frequency peaks with piston position. In FIG. 1, a piston 1 travels as indicated by the double directional arrow 2 in a cylinder 3 between a limit 4 at the expanded end of the cavity or travel and a limit 5 in the vicinity of a closed or head end 6 where the cavity is considered collapsed. The length between the piston 1 and the head 6 is the cavity 7 containing hydraulic fluid introduced and removed through ports, not shown, and in which electromagnetic waves in frequencies that vary over the range of frequencies at which resonance will occur within the piston travel are introduced through a coupler, not shown.

Further, in FIG. 1 in the dimensionally correlated graph of Resonance Frequency Peaks vs Amplitude, the curve 8 depicts the nonlinear increase in fundamental resonance amplitude and frequency with decrease in cavity length as the piston travels from the extended cavity limit 4 toward the collapsed cavity limit 5.

Referring to FIG. 2 there is illustrated a portion of a hydraulic cylinder transfer characteristic curve depicting the general shape of a resonance signal 9, which in turn is an envelope of frequencies with a peak region 10. The extremes of the envelope on either side of the peak region 10 usually have different slopes. One effect of the shape of the signal and the device and service differences is a region of indeterminate measurability which operates to obscure direct measurement of the peak region 10.

In FIG. 3 there is a schematic functional block illustration of the electromagnetic wave hydraulic cylinder piston position sensor of the invention. In the cylinder 3 the piston 1 and attached rod 11 travels as indicated by the arrow 2 in the cavity 7. A frequency signal, that varies over the range of critical frequencies at which fundamental resonances occur in the cavity 7 in the travel of the piston 1, is transmitted by the transmitting section 13 into the hydraulic fluid in the cavity 7 via the coupler 14. Frequency signals received at coupler 15 are processed in the receiving section 16, where the presence of a resonance signal is identified by a comparison with a threshold level. A control section 17 communicates with the receiving section 16 and the transmitting section 13 through channels 18 and 19 respectively. In accordance with the invention the gain of the receiving section 16, in turn, is dynamically changed to provide a signal processing level adjustment at each cycle of processing. In the control section 17 information identified with each resonance signal is converted to count information using a divided sample of the transmitted frequency from the transmitting section 13. The divided sample is used to gate a precision oscillator signal in a counter the counts of which are proportional to the piston distance travelled. Correlation of the count information with piston distance travelled is tabulated in a static cylinder characterization operation before use.

In electromagnetic wave hydraulic cylinder piston position sensing systems, the shape of the peak region of the signal and the fact that there are a number of variables related to lot to lot manufacturing differences and items related to use in service, make accurate prediction of the insertion loss at resonance impossible. As examples, such variables include but are not limited to, items such as size differences between cylinders, any seal leakage both electrical and hydraulic, differences between static and dynamic operation, differences in direction of operation, differences in temperature response, differences in oil such as pressure, composition and contamination, and differences in performance over the lifetime of the apparatus. Each, and combinations thereof, may affect the ability to accurately determine a resonance frequency. Those variables may be called device and service differences. The effect of many of those device and service differences, the shape of the peak region of the resonance signal itself, and variations in the estimate of the size of the equalization signal, may result in excessive variation in insertion loss at resonance.

Referring to FIG. 4 there is shown a graphical illustration of the range of the dynamic gain adjustment of the invention. In FIG. 4 the curve 20 corresponds to the curve 8 of FIG. 1 and the curve 21 is an equalizer signal curve which is estimated to be equal and opposite to curve 20 as described in U.S. Pat. No. 5,182,979. The combination of the two gain values at each point results in a gain reference, labelled element 22, with a 0 dB slope. In accordance with the invention, a dynamic gain adjustment of the order of the separation between curves 20 and 21 is available for increased precision and to compensate for any deficiency in the equalization signal estimate. A dynamic gain variation of for example of +7 dB at 23 to −7 dB at 24 will result in a satisfactory dynamic gain adjustment range labelled element 25. A dynamic gain adjustment in that range will provide any needed attenuation or incrementation to the gain to keep the signal in the receiving section of FIG. 3 within the threshold range of about 3 dB within each processing cycle. The dynamic gain adjustment of the invention involves a loop, that compares measured frequency information at a detected resonance frequency with stored resonance frequency values established for the particular cylinder involved, and adjusts the gain in response to keep within the threshold range and to permit narrower threshold ranges for greater sensitivity. The dynamic gain adjustment signal development includes a comparison operation that compares measured resonance frequency information appearing at a channel 18 of FIG. 3 when resonance is detected at a point in piston travel, with a value in a "look up" table that contains a tabulation of resonance frequency information that was compiled and stored in a characterization operation for the particular cylinder for all piston positions over the length of piston travel. The comparison operation, provides, through the communication channel 18 of FIG. 3, to an adjustment element in the receiving section 16, an adjustment "direction" signal of "up" or "down" to indicate whether the adjustment is to be an increment or an attenuation, and also provides an "amount" signal to the adjustment element based on how large the difference is between the detected resonance frequency and the value in the "look up" table. The dynamic gain adjustment loop thus changes the gain continuously as the piston in FIG. 1 moves back and forth in the cylinder 2 in correspondence to the stored resonance frequency values for the various piston positions.

Referring to FIG. 5, an illustrative functional diagram for producing the dynamic gain adjustment of the invention in the range 25 of FIG. 4 is shown. In FIG. 5 there is an adjusting member located in the receiving section 16 of FIG. 3 which receives at a the input 31 the received signals from the coupler 15 in FIG. 3. The adjusting member 30 provides an increment or decrement to the received signals and delivers them to the output 32. The adjusting member 30 receives a four bit adjusting instruction on lines 34–37. The adjusting instruction provides "up/down" and "quantity" information that increments or attenuates the signal within the range 25 of FIG. 4. The adjusting instruction is developed in a comparison operation 38 that compares a correlated value from the tabulated characterization information that has been stored in a memory element 39 with the particular value at terminal 40 and where a difference greater than the threshold range is detected, the adjustment signal is on lines 34–37.

BEST MODE FOR CARRYING OUT THE INVENTION

In FIGS. 6–11, there is described an embodiment of the invention including dynamic gain adjustment.

While there are a number of ways in the art of detecting a fundamental resonance frequency, in accordance with the invention, the use of "frequency lock loop" circuitry to detect and track "lock on" points on the positive and negative slope intercepts of the resonance frequency signal envelope, together with selection of the location level of those "lock on" points with reference to the maximum amplitude dB and width of the envelope at that location level, permits calculations that yield highly accurate resonance frequency values with accommodation for device and service performance differences in the sensing system. Computation is employed in establishing an effective position for the resonance.

The criteria involved in the selection of the "lock on" level and measurement parameters are illustrated in connection with FIGS. 6 and 7; wherein, in FIG. 6 there is provided a more detailed illustration of the electromagnetic wave resonance signal 9 of FIG. 2 in which the envelope of frequencies in the resonance has positive and negative intercepts from a reference level that is positioned away from the peak region of the signal.

In FIG. 6 the resonance signal 44 is an envelope of frequencies that intercepts a reference level 48 at a positive intercept P1 labelled element 45, passes through a rounded peak region 47 and then intercepts the reference level 48 at the negative intercept P2 labelled element 46, often continuing to an antiresonance 49. The reference level 48 is separated from the peak region 47 by several dB on the Gain scale.

In correlating the resonance signal 44 with a particular piston position, as the demands of accuracy become more rigorous, it becomes increasingly necessary to acquire a precise effective frequency and thus position value for the resonance signal. An accommodation for the factors that prevent accurate measurement, as described in U.S. Pat. No. 5,325,063 is achieved by selecting the reference level 48 at a gain level separated from the peak region 47. For a variety of reasons the best performance is obtained when the threshold level 48 is set approximately 5 dB below the resonance peak region 47. Significant variation from the set threshold can cause loss of frequency lock or false frequency lock. Even minor variations from the threshold level can cause increased accuracy errors.

An accurate effective value for the center period (Peff) of the resonance would be a function of P1 and P2 that can be expressed as F(P1, P2), the simplest example of which would be expressed as in equation 1.

$$F(P1, P2) = (P1+P2)/2 \qquad \text{Equation 1}$$

The difference between the intercepts P1 and P2 determines a resonance width parameter that can be expressed as P2/P1; any other equivalent expression of a resonance width parameter such as loaded "Q", could also be used.

The criteria involved in the selection of the "lock on" level and measurement parameters are illustrated in connection with FIGS. 7, 8 and 9; wherein in FIG. 7 an illustration is provided of the considerations involved in the selection of the level; in FIG. 8 a graphical illustration is provided of the advantages of taking the measurements in terms of the "period" and the "count" in correlating the information developed with piston travel; and; in FIG. 9 an example correlating tabulation is shown of the cylinder data taken in a static characterization, of frequency, period, counts, period of counts and piston travel distance.

Referring to FIG. 7, four example resonance curves A–D at increasing values of gain or decreasing values of insertion loss, are illustrated with relation to the fixed measurement level 48 in FIG. 6 labelled "E" and positioned as an example 5 dB below the peak region.

In the case of curve A, no "lock on" would be detected because there are no intercepts with the reference level E. A large gain increase of around 5 dB would be indicated. In the case of curve B there are intercepts at points 50 and 51 but the value of P2/P1 at the bandwidth between those intercepts would be less than the value of P2/P1 at 5 dB below the peak region. A moderate increase in gain of about 1 dB would be indicated. In the case of curve D there are intercepts at points 52 and 53 but the value of P2/P1 at the bandwidth between those intercepts would be greater than the value of P2/P1 at 5 dB below peak so that a moderate decrease in gain would be indicated. In the case of curve C the value of P2/P1 for the bandwidth between the intercepts 45 and 46 is equal to the value of P2/P1 for the 5 dB below peak level and that level would be selected. The positive intercept is labelled P1 and the negative intercept is labelled P2.

As the frequency of the transmitting section 13 of FIG. 3 increases, and a "lock on" of a particular resonance occurs at P1 a temporary frequency increment is added that moves the frequency to the vicinity of and slightly beyond P2, so that the frequency lock circuitry can search and lock onto the negative intercept at P2.

Having set the Gain level at level 48 at the example of about 5 dB below the peak region 47 and at a high value of P2/P1 between the intercepts; the values for Peff and P2/P1, measured at each point in a static characterization operation and tabulated in correlation with piston position are stored in a table indexed through values of Peff. The value P2/P1 at a given dB level below the peak region is uniquely related to the loaded "Q" of the cavity.

In FIG. 8, a graph is shown of the variation of "Frequency" (Hz), "Period" (1/Frequency), and "Count". Count may be defined as a counter output of a divided sample of the frequency with respect to piston travel distance. In FIG. 8 the frequency curve is non-linear, whereas both the "Period" and the "Count", which is proportional to the "Period", curves are linear and thus are directly correlatable with piston travel. The linearity provides advantages in taking measurement information in terms of "Period" and "Count".

Each cylinder piston position sensing system is individually characterized, for example by incrementally moving the piston throughout the cavity or stroke length (between 4 and 5 in FIG. 1) in increments as small as the resolution of the sensing system will permit while the "period" values at P1 and P2 respectively are measured, Peff and P2/P1 are calculated and all are stored for each position. The increments do not have to be equal Usually the distance between increments is longer at lower frequencies. In addition the number of "counts" in each resonance at 16 MHz, the example precision oscillator frequency, and ,the period of a 16 MHz count, the transmitted frequency and the period of the transmitted frequency all correlated with piston travel distance may also be tabulated. The stored information provides static measured information of the resonance frequency at each piston position throughout the stroke length. A look up table with an appropriate index such as Peff may be assembled using the characterization information for use both in the dynamic gain adjustment and in correlating counts in the counters with piston travel. The stored information values that are placed in the look up table for use in dynamic adjustment may be in the form for use or calculations may be performed on the measured values as each is used.

An example of the look up table is shown in FIG. 9. The table is assembled using the width parameter characterization data correlated with piston position and tabulated using an appropriate index. The table is used in calculating dynamic gain adjustment and correlating counts with piston travel. The values that are placed in the table may be in the form for direct use or as data for calculations as used.

In FIG. 10 a general cycle event time chart is provided. In the chart there are five time segments T1 to T5 in a cycle between reset signals. The cycle period includes "search" and "lock" periods for each of the positive and negative- "lock on" points and a calculation and transmission period in which the period, the Peff and the P2/P1 values are established, comparison is made with the value from the "look up" table in element 39 of FIG. 5, and a determination of the dynamic gain change, within the range 25 in FIG. 4, that is to be made, followed by transmission of the change, takes place. The change is then used at the next cycle.

In FIG. 10, at T1 the search and lock for the positive slope intercept P1 of FIG. 6 takes place followed by a count and read period labelled T2. At T3 the search and lock for the negative slope intercept P2 of FIG. 6 takes place followed by a count and read period labelled T4. In the T5 period the Peff, and P2/P1 values described in connection with FIG. 6 are calculated, a comparison operation as in element 38 of FIG. 5, with the look up table value in element 39 of FIG. 5 is made and the adjustment signal of up/down and amount information is transmitted for dynamic gain adjustment. The events of the chart of FIG. 10 are executed each cycle, which as an example may be 20 milliseconds. An actual adjustment change only occurs when needed.

In FIG. 11 there is shown a functional block diagram of a preferred embodiment of the invention.

Referring to FIG. 11, the cylinder coupling is that of the direct adjacent coupler separation with an odd multiple of that separation in the opposite path around the circumference of the cylinder, as described in copending application Ser. No. 08/437,735, filed May 9, 1995, as applied to the rod side of the piston in the cylinder. In the cylinder 60, the piston 61 is shown dotted on the rod 62. The transmit 63 and receive 64 couplers are mounted 90 degrees apart on the peripheral circumference of the cylinder 60 with two selected length dummy couplers (not shown) each at a further 90 degree separation on the peripheral circumference of the cylinder 60 from an adjacent transmit coupler 63 or receive coupler 64. The hydraulic fluid containing cavity 65 is coaxial with four fold symmetry wherein standing wave propagation is in the (TEM) mode and adjacent modes are suppressed. Strong, well defined, signals are produced at each resonance over the full travel of the piston 62 in the cylinder 60.

In general operation, in piston sensing signal processing, in a transmitting section, a frequency signal is introduced into the cavity 65 that varies in frequency over a range that would include all the resonance frequencies of all cavity lengths that would correspond to the full piston travel. In a receiving section, the frequency signals of the fundamental resonances received at each increment of piston travel, are compared with a threshold level and through comparator circuitry and computation the particular resonances are correlated with piston position and the related aspects velocity and acceleration. In this invention as illustrated in FIGS. 4 and 5, dynamic step adjustment is performed on an equalized received signal.

In FIG. 11 the transmitting section 13 of FIG. 3, shown in dotted outline, involves elements 66–71 which deliver the input frequency signal through conductor 66 to input coupler 63. Two voltage controlled oscillators 67 and 68 are used in the presence of a voltage signal at terminal 69 to produce a beat signal that covers the range, for example from 50 MHz to 1800 MHz, of resonance frequencies to be encountered in the piston travel. At the low frequency , about 50 MHz, both oscillators 67 and 68 are at about 5000 MHz, whereas at the high frequency, about 1800 Mhz, one oscillator would be at about 5000 MHz and the other would be at about 3200 MHz. The outputs of the oscillators 67 and 68 are combined in a balanced mixer 70 the output of which is passed serially through a low pass filter 71.

The receiving section 16 of FIG. 3, shown in dotted outline, involves elements 81–89, delivers from coupler 64, on conductor 80 the resonance frequency signals processed at each cycle of the timing chart. In receiving section 16 the signals pass through a selectable attenuator element 81, an amplifier equalizer element 82, a detector element 83, to a threshold comparator 84. The selectable attenuator element 81, which can be positioned in either the path of conductor 66, or as shown, in the path of conductor 80. It dynamically adjusts the gain or signal processing reference within the range 25 of FIG. 4. The amplifier equalizer element provides an impedance that is substantially equal to the inverse of that of the cylinder 60 so as to produce the zero slope reference 22 of FIG. 4. The detector element 83 provides a signal indicative of the amplitude for use in a comparison with a constant threshold voltage in the threshold comparator element 84.

When the signal indicates comparison in element 84 the intercept P1 of FIG. 6 has been reached. The signal from element 84 enters an invert-non invert amplifier 85 and select switch 86 to an integrator 87 having an output that feeds back to the voltage controlled oscillator 67 through conductor 88. The invert non-invert amplifier 85 and select switch 86 inverts signal from element 84. Capacitor 89 is connected between line 126 and the input of the integrator 87. The voltage on line 126 controls the position of select switch 86 and creates a charge spike from capacitor 89. During voltage changes the charge spike from capacitor 89 temporarily increases the frequency of the oscillator 67 sufficiently to be near but beyond the declining portion of the resonance envelope so that the frequency locked loop circuitry locks on and establishes the intercept P2 of FIG. 6. The operation is reversible. The circuitry also moves the frequency locked loop from the intercept P2 to the intercept P1.

The control section 17 of FIG. 3 involving elements 90–131 shown in dotted outline, includes a controller element 90, a "look up" store element 91 with an output into the controller 90, a prescaling element 92, having an enabling function, and having an input connected to the output of element 71 of the transmitting section 13 and an enabling input connected to a lock detecting element 93, the input of which is connected to the output of the threshold comparator 84. The output of the prescaling element 92, through a back circuit inhibiting diode 94 is the input to a counting means 95, enclosed in a dotted line, that develops position information. The counting means is made up of: a first flip-flop 96 of the "D" type having a "SET" input, a "RESPONSE" input and "POSITIVE" and "INVERTED" outputs; a second "D" type flip-flop 97; a first counter 98; a second counter 99; a third counter 100; an "And" element 101 and a precision oscillator 102, that delivers square 16 MHz pulses that have sufficient definition to be sensed separately on leading and trailing portions, and which is located in the controller 90.

The output of the element 94 is connected to an input 103 of flip-flop 96 and to input 104 of "and" element 101. The output 105 of counter 98 is connected to an input 106 of flip-flop 97, serves, through a back circuit inhibiting diode 107 as the remaining input 108 of "and" element 101 and also serves as an input 109 to the controller 90. The inverted output 110 of the flip-flop 96 is connected to input 111 of counter 98 and to one input 112 of counter 100. The output 113 of the precision oscillator 102 is connected to input 114 of counter 99 and to input 115 of flip flop 97.

The output 116 of counter 100 is connected to the input 117 of the controller 90. The positive output 118 of flip-flop 96 is connected to input 119 of counter 99, which carries the overflow of counter 99 to counter 100. The output 120 of flip-flop 97 is connected to input 121 of counter 99. The output 122 of counter 99 is connected to input 123 of counter 100. The controller 90 provides reset signals at terminals 124 and 125 respectively to flip-flop 96 and integrator 87, and it also provides a select signal to the switch element 86 on conductor 126. The controller 90 in addition to providing position related computations also performs the comparison operation of element 38 in FIG. 7 using "look up" data from element 91 and information from the counting means 95 to deliver up/down direction signals and amount signals on conductors 127–130 to the selectable attenuator 81. The controller 90 also has an external utilization output 131 for the delivery of piston position, and related velocity and acceleration information.

In order to provide a starting place in practicing the invention the following counting example and specifications are provided. The components are standard elements in the art.

For definition purposes, when a counter is "cleared" it cannot operate and all outputs are zeros; and when a flip flop is "cleared" it is operable, the "SET" terminal is high, the positive output is zero and the invert output is 1.

In operation the counter is synchronized under the following conditions.

The controller 90 holds the "RESET" terminal of the flip-flop 96 low which retains the flip flop in a cleared condition. In this condition the positive output 118 is low which holds input 119 so that counter 99 is in a cleared condition whereas the inverted output 110 of flip-flop 96 is high which holds counters 98 and 100 in the reset condition. The output 105 of counter 98 being low holds flip-flop 97 through terminal 106 in a cleared condition which in turn causes the inverted output 120 thereof to be high and enable counter 99 at terminal 121 even though counter 99 is being held in a cleared condition by the condition of flip-flop 96. The high condition of terminal 108 enables the "and" element 101. The transmit section frequency, divided by 256 is impressed at terminals 103 and 104, and because the "and" gate 101 is enabled it is also impressed on the counter 98 at terminal 132. The counting is enabled by the controller changing the reset signal at terminal 124 from low to high which in turn is impressed via line 133 on the "RESET" terminal of the flip flop 96. Lines 134 and 135 do not change.

The synchronized count of counters 98 and the 99–100 combination begins with line 136 going from low to high when the lock detect element 93 enables the element 92 that provides a divided source of the transmitted frequency. Line 134 changes from low to high, enabling counter 99 which counts the rising edges of the 16 MHz pulses impressed via line 137. No time conflict exists because lines 134 and 137 are synchronous. Line 135 changes from high to low, which enables counters 98 and 100. Counter 98 counts the trailing edges of the pulses passing through "and" 101 and impressed at input 132. No time conflict exists on the counter 98 start up because counter 98 is enabled on the leading edge of line 136 whereas the count is based on the trailing edge of the pulses.

The synchronized count of counters 98 and the 99–100 combination stops when the counter 98 counts to the effective equivalent of a scaled period of a resonance. For an example where the period is 130944 cycles, a division in element 92 of 256 would yield 511.5. At the example count of 511.5, the 0.5 being the trailing edge of the last count, line 138 changes from low to high removes flip flop from the cleared condition so that the next low to high transition on line 137 (the next leading edge of a 16 MHz pulse) causes line 139 to go low which stops the count in the 99–100 counter combination. No time conflict exists in the count stopping because the transport delay of flip flop 97 guarantees that the 99–100 counter combination will have had time to complete all in process transitions before the counting process is disabled by line 139 going low. Line 140 changes from high to low which is a signal to controller 90 that the count is complete. Line 140 also disables "and" 101 which stops counter 98. No time conflict exists because all in process transitions in the counters are complete before the count is stopped. The controller reads the counters via line 141 at times T2 and T4 of the timing cycle. The counting cycle repeats when the controller 90 again changes the reset line 133 from low to high.

Example specifications are as follows.

A satisfactory operating voltage is about +24 V. D.C.

The signal transmitted on conductor 66 to coupler 63 varies from about 50 MHz to about 1.6 GHz.

A satisfactory prescaler element 92 is a model MB506 manufactured by Fujitsu and set to divide by 256.

A satisfactory selectable stepping attenuator 81 is the AK0020Y-24 model manufactured by Alpha Industries, which provides 0–15 dB attenuation in equal steps.

The lock detector element 93 is a standard window comparator in the art made up of parallel connected comparators.

The "look up" table store, element 91, is a standard programmable read only memory element, some models of which are referred to in the art as PROMS. A satisfactory PROM model is the TMS27PC512 model manufactured by Texas Instruments(TI).

The controller element is a standard microprocessor in the art. A satisfactory microprocessor is the MC68HC11 model manufactured by Motorola, of Roselle Ill.

The counter elements 98 and 100 are standard integrated circuits in the art. A satisfactory integrated circuit model is the 74HC 4040 manufactured by TI.

The counter element 99 is also another standard integrated circuit in the art. A satisfactory integrated circuit model is the 74HC161 manufactured by Motorola.

The "D" type flip flop may be the model 74 HC74 manufactured by Motorola.

The element 89 is a 200 picofarad capacitor.

It will be apparent that while the elements of the counting means 95 are illustrated for clarity as a discrete assembly the elements and functions could readily be incorporated into the controller by providing the capacity therein.

What has been described is dynamic gain adjustment in hydraulic piston position sensing over the travel length of the piston by incrementing or decrementing the gain in a control loop through a comparison at each piston position of resonance information with stored resonance information.

Other aspects, objects and advantages of the invention can be obtained from a study of the drawings, the specification and the appended claims.

What is claimed is:

1. In a hydraulic cylinder piston position sensing system of the type wherein resonance frequencies of electromagnetic energy in the hydraulic fluid filled cavity made up of the piston, the cylinder and an enclosed end of the cylinder are correlated with the position of the piston, the improvement comprising: the dynamic adjustment of the equalized gain of the resonance frequency signal processing with piston position change said equalized gain using a selectable stepping attenuator positioned in resonance signal processing circuitry.

2. In a hydraulic cylinder piston position sensing system of the type wherein resonance frequencies of electromagnetic energy in the hydraulic fluid filled cavity made up of the piston, the cylinder and an enclosed end of the cylinder are correlated with the position of the piston, the improvement comprising: the dynamic adjustment of the equalized gain of the resonance frequency signal processing with piston position change by changing the equalized gain through use of a selectable attenuator and further based on a difference between a dynamically measured resonance width parameter at a piston position with a stored resonance width parameter.

3. The improvement of claim 2 wherein said measured width parameter is a mathematical function of the positive and negative slope intercepts of said resonance signal with a reference level.

4. The improvement of claim 3 wherein measured resonance width parameter is the ratio of the negative to the positive slope intercepts or P2/P1.

5. The improvement of claim 4 wherein said reference level is at a location that is separated from an indeterminate measurement location in the vicinity of the peak of said resonance signal.

6. The improvement of claim 5 wherein said location is about 5 dB below the peak region of said resonance frequency signal.

7. Apparatus for sensing the position of a piston in a hydraulic cylinder comprising in combination: transmitting means for introducing electromagnetic wave energy at a first coupler into the hydraulic fluid in said hydraulic cylinder between said piston and an end of said cylinder, said energy varying in frequency through a range that includes all critical resonance frequencies of all piston positions, receiving means for sensing and processing resonance signals sensed delivered through a second coupler in said hydraulic fluid in said hydraulic cylinder, and, said receiving means including a dynamic equalized gain adjusting means including a stepped attenuator adjust the gain of said processing of resonance signals in relation to stored gain information for each position of said piston.

8. The apparatus of claim 7 wherein said first and said second couplers are positioned with 90 degree separation around the peripheral circumference of said cylinder.

9. The apparatus of claim 7 wherein said gain adjusting means is further adapted for comparison of a measured resonance width parameter with a correlated stored resonance width parameter for the position of said piston and for introducing change of said gain in the direction of reducing any difference between said measured resonance width parameter and said stored resonance width parameter.

10. The apparatus of claim 9 wherein said measured resonance width parameter is developed from measurements taken from the resonance frequency signal envelope at reference level location that is separated from an indeterminate measurement location in the vicinity of the peak region of said resonance frequency signal.

11. The apparatus of claim 9 wherein said location is about 5 dB below said peak region of said resonance frequency signal.

12. The apparatus of claim 10 wherein said gain adjustment involves selectable stepping attenuation of said resonance signal in said receiving means.

13. The apparatus of claim 11 wherein in the processing of the resonance signals in said receiving means said gain adjusting includes selectable stepping attenuation in a next subsequent signal processing cycle of an amount and direction determined by the difference between measured and stored resonance width parameter values established in an immediately preceding processing cycle.

14. The apparatus of claim 12 wherein said measured resonance width parameter is developed from information taken from the resonance width parameter at a reference level location that is separated from an indeterminate measurement region in the vicinity of said peak region of said resonance frequency signal.

15. The apparatus of claim 13 wherein said reference level location is about 5 dB below the peak region of said resonance frequency signal.

16. The process of establishing the piston position in a hydraulic cylinder piston position sensing system that employs resonance frequency signals as indicative of piston position comprising the steps of:

characterizing each cylinder by statically measuring and storing resonance frequency signal information for each piston position, and, producing piston position and dynamic equalized gain change adjustment using a stepping attenuator determinations in said sensing system processing based on a comparison of stored resonance information with measured resonance information.

17. The process of claim 16 wherein said resonance information is at least one resonance width parameter.

18. Apparatus for sensing the position of a piston in a hydraulic cylinder comprising in combination:

storage means adapted for storing information on at least one width parameter of a resonance frequency envelope in the hydraulic fluid in said cylinder correlated with piston position for each piston position in said cylinder, transmitting means for introducing electromagnetic wave energy at a first coupler into the hydraulic fluid in said cylinder between said piston and the end of said cylinder, said electromagnetic energy varying in frequency through a range that includes all critical resonance frequencies of all positions of said piston, and, receiving means for sensing and processing resonance frequency envelope signals delivered through a second coupler in said hydraulic fluid, said signal processing being adapted to measure equalized gain width parameter information adjusted with a stepping attenuator of each sensed resonance frequency envelope signal, said signal processing being further adapted to identify the piston position corresponding to a sensed resonance frequency width parameter by comparison with a corresponding stored piston position correlated resonance frequency envelope width parameter in said storage means.

19. The apparatus of claim 18 wherein said signal processing in said receiving means is further adapted to adjust the gain of said processing of resonance signals in relation to stored gain information for each position of said piston.

* * * * *